(12) United States Patent
Quintero (10) Patent No.: US 8,453,536 B1
(45) Date of Patent: Jun. 4, 2013

(54) STOWABLE HANDLE APPARATUS FOR ASSISTING IN REPOSITIONING AN OBJECT

(75) Inventor: Robert Anton Quintero, San Jose, CA (US)

(73) Assignee: Millpro Precision Machining, San Jose, CA (US)

( * ) Notice: Subject to any disclaimer, the term of this patent is extended or adjusted under 35 U.S.C. 154(b) by 92 days.

(21) Appl. No.: 13/089,215

(22) Filed: Apr. 18, 2011

Related U.S. Application Data (60) Provisional application No. 61/325,724, filed on Apr. 19, 2010.

(51) Int. Cl.
*G05G 1/10* (2006.01)

(52) U.S. Cl.
USPC .......................................................... 74/543

(58) Field of Classification Search
USPC .............. 74/543, 546, 547, 594.7; 280/1.188, 280/47.315, 87.05
See application file for complete search history.

(56) References Cited

U.S. PATENT DOCUMENTS

| | | | | |
|---|---|---|---|---|
| 2,108,554 A * | 2/1938 | Berg | | 74/547 |
| 3,858,823 A * | 1/1975 | Quenot | | 242/395.1 |
| 3,967,834 A * | 7/1976 | La Charite | | 280/291 |
| 5,273,300 A * | 12/1993 | Wells | | 280/259 |
| 6,450,517 B1 * | 9/2002 | Lee | | 280/87.041 |
| 2002/0020980 A1* | 2/2002 | Lee | | 280/87.041 |

* cited by examiner

*Primary Examiner* — Vicky Johnson
(74) *Attorney, Agent, or Firm* — Henricks, Slavin & Holmes LLP (57) ABSTRACT

A stowable handle apparatus includes a mounting device configured to facilitate securing the handle apparatus to an object and a grip member mechanically coupled to the mounting device such that the grip member is selectively repositionable between a stowed configuration in which the grip member is adjacent to a portion of the object when the mounting device is secured to the object, and a deployed configuration in which the grip member is oriented in relation to the mounting device such that at least a portion of the grip member extends from the object, with the grip member being operatively engaged with the mounting device in a manner facilitating an action by a user of the handle apparatus imparting a force against the grip member to lift or reposition the object.

17 Claims, 7 Drawing Sheets

STOWABLE HANDLE APPARATUS FOR ASSISTING IN REPOSITIONING AN OBJECT

CROSS-REFERENCE TO RELATED APPLICATIONS

This application claims the benefit of U.S. Provisional Application No. 61/325,724, filed on Apr. 19, 2010, which is hereby incorporated by reference.

TECHNICAL FIELD

The invention relates generally to devices that facilitate the grasping and repositioning of objects and, in particular, to a stowable handle apparatus which allows a person to more easily reposition an object to which the apparatus is attached.

BACKGROUND ART

Many motorcycles have aftermarket stands which, when deployed, serve as a support mechanism providing the motorcycle with free standing stability in the absence of the user. Typically, it is necessary to first lift one side of the motorcycle at least several inches from the ground in order to deploy such a stand. A type of stand commonly referred to as a "center stand" is often positioned at or near the center of the motorcycle where a stable balance is achieved for managing the center of mass of the motorcycle. The typical design and function of a center stand requires that the motorcycle user place his or her foot on a leverage member (e.g., a foot bar on the center stand) and pull the motorcycle in a backward and upward motion to transfer the weight of the motorcycle into a stable position with the center stand deployed. Unfortunately, many motorcycles do not include structural members or other components suitable for securely, comfortably and/or conveniently taking hold of (e.g., gripping or mechanically engaging) the motorcycle to perform this action.

Thus, it would be useful to be able to provide an apparatus, device or mechanism to assist a user of a motorcycle in more easily achieving the mechanical advantage required to lift the motorcycle on to its center stand.

It would also be useful, more generally, to be able to provide an apparatus, device or mechanism for securely, comfortably and/or conveniently gripping or mechanically engaging a variety of different objects, such as motorcycles or other objects that may be cumbersome to lift or reposition.

It would also be useful to be able to provide an apparatus, device or mechanism for mechanically engaging an object that is to be lifted or repositioned without having to redesign or make any significant structural changes to the object.

It would also be useful to be able to provide an apparatus, device or mechanism for mechanically engaging an object that is to be lifted or repositioned without interfering with the normal or ordinarily intended operational capabilities of the object.

SUMMARY OF THE INVENTION

The present invention generally involves apparatuses, devices and mechanisms configured to facilitate gripping or mechanically engaging an object to provide greater mechanical advantage in lifting or repositioning the object. In various example embodiments, a handle apparatus includes a grip member that is deployable to provide such mechanical advantage and stowable at the user's convenience.

In an example embodiment configured for a motorcycle, a stowable handle apparatus is affixed to a structural portion of the motorcycle and is configured to allow a grip member of the apparatus to be selectively deployed or stowed by a user of the motorcycle. When deployed, the grip member assists the user of the motorcycle in mechanically engaging the motorcycle for lifting or repositioning the motorcycle. When stowed, the grip member is sufficiently recessed or substantially flush in relation to adjacent portions of the motorcycle to prevent the grip member from interfering with the normal or ordinary use of the motorcycle by a rider of the motorcycle.

In an example embodiment, a stowable handle apparatus includes a mounting device configured to facilitate securing the handle apparatus to an object and a grip member mechanically coupled to the mounting device such that the grip member is selectively repositionable between a stowed configuration in which the grip member is adjacent to a portion of the object when the mounting device is secured to the object, and a deployed configuration in which the grip member is oriented in relation to the mounting device such that at least a portion of the grip member extends from the object, with the grip member being operatively engaged with the mounting device in a manner facilitating an action by a user of the handle apparatus imparting a force against the grip member to lift or reposition the object.

In another example embodiment, a lifting device for providing mechanical advantage in transferring an object from one position to another more stable position includes one or more hand grip handles configured to be affixed to a structural member of the object at a position providing a user, or users, of the lifting device with mechanical advantage to lift or reposition the object to a new position when one or more of the hand grip handle are deployed for use, the hand grip handles being configured to not significantly interfere with the general use of the object during normal operations when the hand grip handles are not deployed.

In another example embodiment, an apparatus for stowing and deploying a hand grip includes a support structure configured to facilitate securing the apparatus to an object of interest; and a bearing and spring mechanism operationally engaged with the support structure and configured to allow the hand grip to be stowed for normal operations of the object of interest or other times when the handle is not in use, and to be deployable into one or more other positions from which the hand grip can be utilized for lifting the object.

DISCLOSURE OF INVENTION

Example embodiments described herein generally involve apparatuses, devices and mechanisms configured to facilitate gripping or mechanically engaging an object to provide greater mechanical advantage in lifting or repositioning the object. Although the discussion below references example embodiments configured to mechanically engage with structural features (e.g., motorcycle frame tubing), it should be understood that the principles described herein are also applicable to other structural features (e.g., different frame configurations and types), in addition to structural features associated with other types of motorized or non-motorized vehicles, as well as other types of objects.

Figure 1:
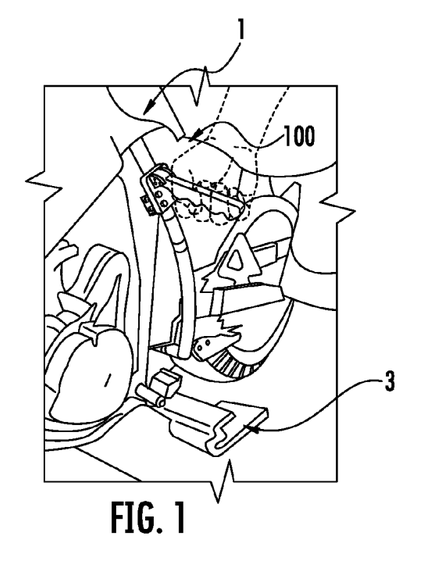
FIG. 1 is a perspective view showing a side portion of a motorcycle and an example embodiment of a stowable handle apparatus shown attached to a portion of the motorcycle frame tubing.
Figure 2:
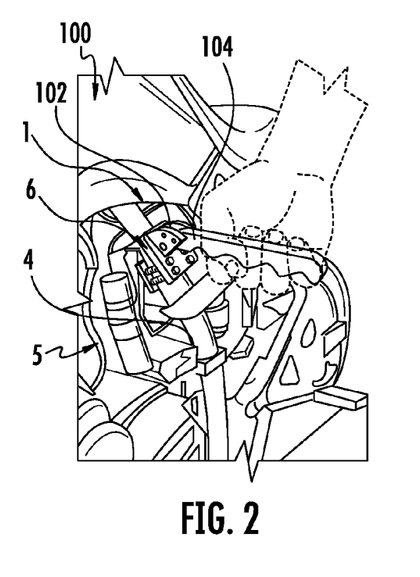
FIG. 2 is a close up perspective view of the stowable handle apparatus (shown in its deployed position, mounted to a piece of frame tubing of the motorcycle) and a recess (defined by the motorcycle frame tubing) into which a grip member of the handle apparatus fits when the grip member is moved to its stowed position.
Figure 3:
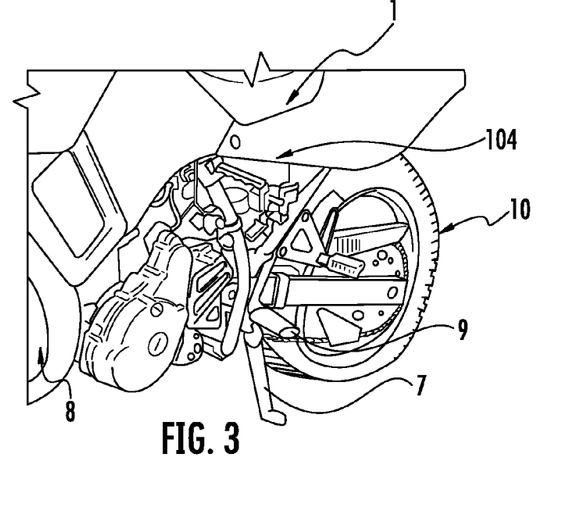
FIG. 3 is a perspective view of the motorcycle and the stowable handle apparatus secured thereto, showing the location of the grip member generally above the center stand of the motorcycle and also in relation to other components of the motorcycle.

Referring to FIGS. 1-3, in an example embodiment, a motorcycle 1 is equipped with a stowable handle apparatus 100 that includes a grip member shown in a deployed configuration, i.e., oriented in relation to the motorcycle in a manner allowing a user of the motorcycle to obtain a secure grip on the grip member as well as mechanical advantage (e.g., a position of leverage). With this mechanical advantage, and referring in particular to FIG. 1, a person is able to, for example, place his or her foot on the center stand 3 of the motorcycle and pull the motorcycle into a stable parked position.

In various example embodiments, an apparatus, device or mechanism is provided for gaining mechanical advantage for a user to transfer the weight of a relatively heavy two wheeled vehicle through a pivotal transition point to come in rest at a stable position on a secondary motorcycle parking stand mechanism.

In various example embodiments, an apparatus, device or mechanism for providing mechanical advantage includes a lift, grip or other member that can be deployed by a user (e.g., when the user requires the mechanical advantage to lift a motorcycle onto its parking stand) and stowed by the user (e.g., during times when the motorcycle is in regular use or being transported).

Referring to FIG. 2, in an example embodiment, a stowable handle apparatus 100 includes a mounting device 102 configured to facilitate securing the handle apparatus 100 to an object and a grip member 104 mechanically coupled to the mounting device such that the grip member 104 is selectively repositionable between a stowed configuration, in which the grip member is adjacent to a portion of the object when the mounting device is secured to the object, and a deployed configuration (FIG. 2), in which the grip member is oriented in relation to the mounting device such that at least a portion of the grip member extends from the object, with the grip member being operatively engaged with the mounting device in a manner facilitating an action by a user of the handle apparatus imparting a force against the grip member to lift or reposition the object.

In this illustrated embodiment, the mounting device 102 is shown mounted to a piece of frame tubing 4 of the motorcycle 1, and the grip member 104 is shown in its deployed position. In this example embodiment, structural features of the motorcycle, namely, the motorcycle frame tubing 4, define a recess 5 into which the grip member 104 fits when the grip member is moved to its stowed position. In this example embodiment, at least a portion of the frame tubing 4 defining the recess 5 is located generally above the center stand 3 of the motorcycle 1. It should be appreciated that recesses suitable for stowing the grip member 104 can be defined (or otherwise provided) in a variety of different ways. Moreover, such a recess or recesses can be defined or provided by the structural features of any type of object.

In example embodiments, the grip member 104 is sized to fit within a recess, which is defined by structural features of an object, when the handle apparatus is secured to the object and the grip member is in the stowed configuration. By way of example, the structural features can include tubing of any sort, as well as other physical structures, irrespective of shape or size.

In example embodiments, the grip member 104 is substantially flush with a portion of the object when the handle apparatus is secured to the object and the grip member is in the stowed configuration. By way of example, and referring to FIG. 2, the grip member 104, after being transitioned to its stowed configuration, is substantially flush with the frame tubing 4 or another side portion of the motorcycle 1.

Referring again to FIG. 2, in this example embodiment, the stowable handle apparatus 100 is mounted to the frame tubing 4 at a mounting location 6 providing sufficient mechanical advantage for a user of the motorcycle to lift the motorcycle into the stable parked position. In an example embodiment, the mounting location 6 is selected (e.g., optimally positioned) to minimize the amount of energy required to transition the motorcycle from an unstable position to a stable position in which the motorcycle can be supported by various commercially available (e.g., aftermarket) parking stand mechanisms.

In various example embodiments, the mounting location 6 and orientation of the grip member 104 are selected to provide easy gripping and/or deploying of the grip member 104 from one or more positions (e.g., from which a user is likely to attempt to grip and/or deploy the grip member 104). In example embodiments, the mounting location 6 and orientation of the grip member 104 in relation to the motorcycle 1 are selected so that the grip member 104 can be used as a handle to release the motorcycle 1 from a stable parked position to prepare for riding.

Referring to FIG. 3, this wider field view of the motorcycle 1 in a stable parked position shows the location of the grip member 104: generally above the center stand of the motorcycle, and also in relation to other components of the motorcycle, namely, the side stand 7, the front tire 8, the foot rest 9, and the rear tire 10.

In various example embodiments, the mounting device 102 includes one or more bracket portions for securing the handle apparatus to an object. It should be understood, however, that the mounting device 102 can also be provided, in whole or in part, by apparatuses, devices and mechanisms other than brackets. By way of example, a portion (e.g., a bracket portion) of the mounting device 102 is configured to be secured about (e.g., adjacent to or facing) a portion of the object.

The bracket portion can include one or more inner surfaces. In various example embodiments, the bracket portion includes at least one inner surface that is complementary in shape to a portion of the object. In an example embodiment, at least one of the one or more inner surfaces is contoured (e.g., to match the contour of the motorcycle frame tube). In an example embodiment, at least one of the one or more inner surfaces is generally arcuate in shape. The one or more inner surfaces can be provided in various shapes including, but not limited to, nonplanar, planar, concave, or convex, and can also include angular transitions, boundaries, or steps, as well as custom keyed shapes (e.g., established in cooperation with a designer or manufacturer of the object).

Figure 4:
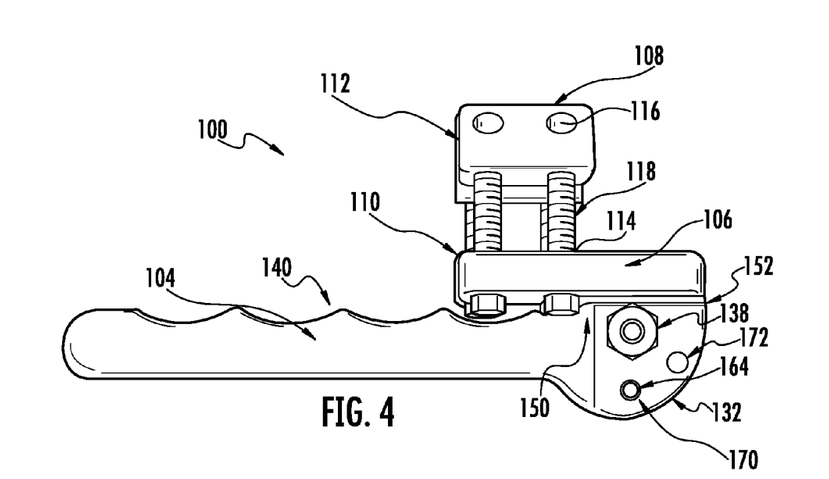
FIG. 4 is a side view of the stowable handle apparatus, shown in its stowed (or retracted) configuration.
Figure 5:
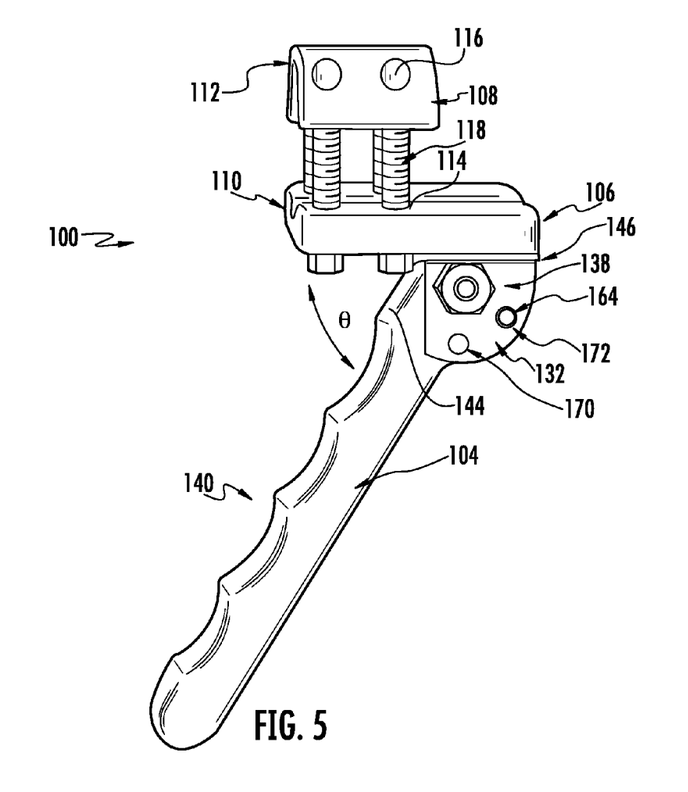
FIG. 5 is a perspective view of the stowable handle apparatus, shown in its deployed (or extended) configuration.
Figure 7:
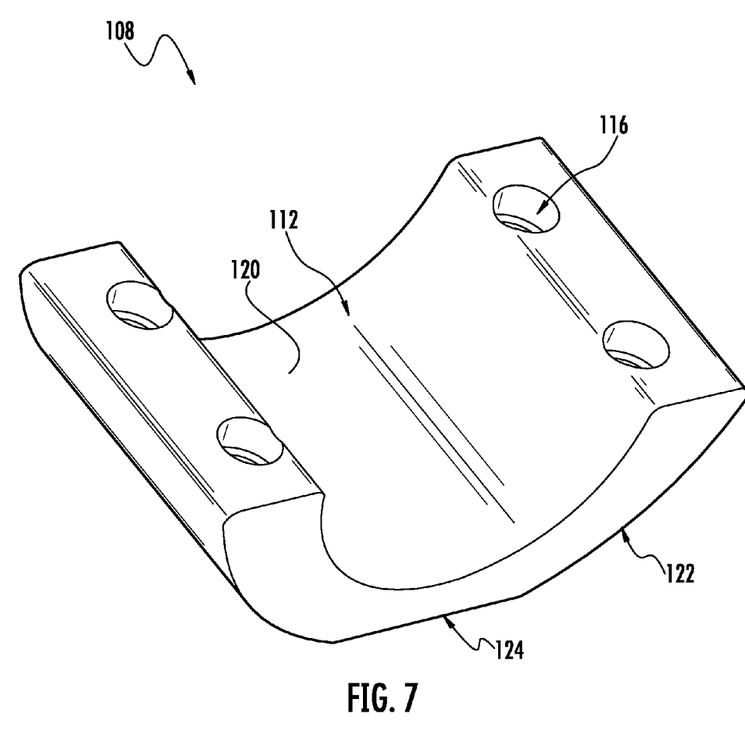
FIG. 7 is a close up perspective view of a back portion (or back strap) of the mounting device.

In various example embodiments, the mounting device 102 is configured and provides a mechanism for interfacing with an object (e.g., an object to be lifted or repositioned). Referring to FIGS. 4, 5 and 7, in this example embodiment, the mounting device 102 includes a front portion (or front mounting plate) 106 and a back portion (or back strap) 108 that include inner surfaces 110 and 112, respectively. By way of example, the inner surfaces 110 and 112 are shaped such that the mounting device 102 is provided with contour mounting plates.

In various example embodiments, the mounting device 102 is configured to be detachably secured to the object. For example, screws or threaded bolts, as well as other mechanisms for providing a detachable mechanical engagement or fitting, can be used to secure the front portion 106 and the back portion 108 together about, adjacent to, or otherwise positionally fixed in relation to a structural feature of the object. In this example embodiment, the front and back portions 106 and 108 include complementary sets of screw holes 114 and 116, respectively, through which screws 118 are threaded to adjust the distance between the front and back portions 106 and 108. In an example embodiment, the bracket portion includes a front portion to which the grip member is mechanically coupled and a back portion mechanically coupled to the front portion such that a distance between the back portion and the front portion is adjustable to secure the handle apparatus to objects of varying dimensions. In other example embodiments, a portion of the handle apparatus is configured to be non-detachably secured (e.g., welded) or otherwise permanently attached and/or fixed in position in relation to the structural feature(s) of the object.

In an example embodiment, at least one of the one or more inner surfaces 110 and 112 includes a surface treatment. By way of example, and referring to FIG. 7, the inner surface 112 of the back portion 108 can be provided with a surface treatment 120. The surface treatment 120 can be a surface treatment for gripping purposes, such as a physical modification (and/or additional material applied) to at least one of the inner surfaces which results in a texture, surface characteristic, or the like that, for example, increases friction between the inner surfaces and the object.

The bracket portion can also include one or more outer surfaces. In various example embodiments, the bracket portion includes at least one outer surface that is complementary in shape to a portion of the object. In an example embodiment, at least one of the one or more outer surfaces is contoured or generally arcuate in shape. Referring to FIG. 7, in this example embodiment, the back portion 108 includes an external curved surface (and/or surface feature) 122. In an example embodiment, at least one of the one or more outer surfaces is flattened, beveled, or otherwise formed, reduced, reshaped, etc. to provide a low profile (or custom profile) portion of the bracket (e.g., to provide clearance with respect to a part of the object, interfit with another structural feature of the object, or facilitate easier installation, removal, or adjustment of the handle apparatus). Referring again to FIG. 7, in this example embodiment, the back portion 108 also includes an external flattened surface (and/or surface feature) 124. The one or more outer surfaces can be provided in various shapes including, but not limited to, nonplanar, planar, concave, or convex, and can also include angular transitions, boundaries, or steps, as well as custom keyed shapes (e.g., established in cooperation with a designer or manufacturer of the object). The back portion (or back strap) 108 can be formed, for example, from a rigid material (such as aluminum), a flexible material, or various combinations of materials.

Figures 8, 9:
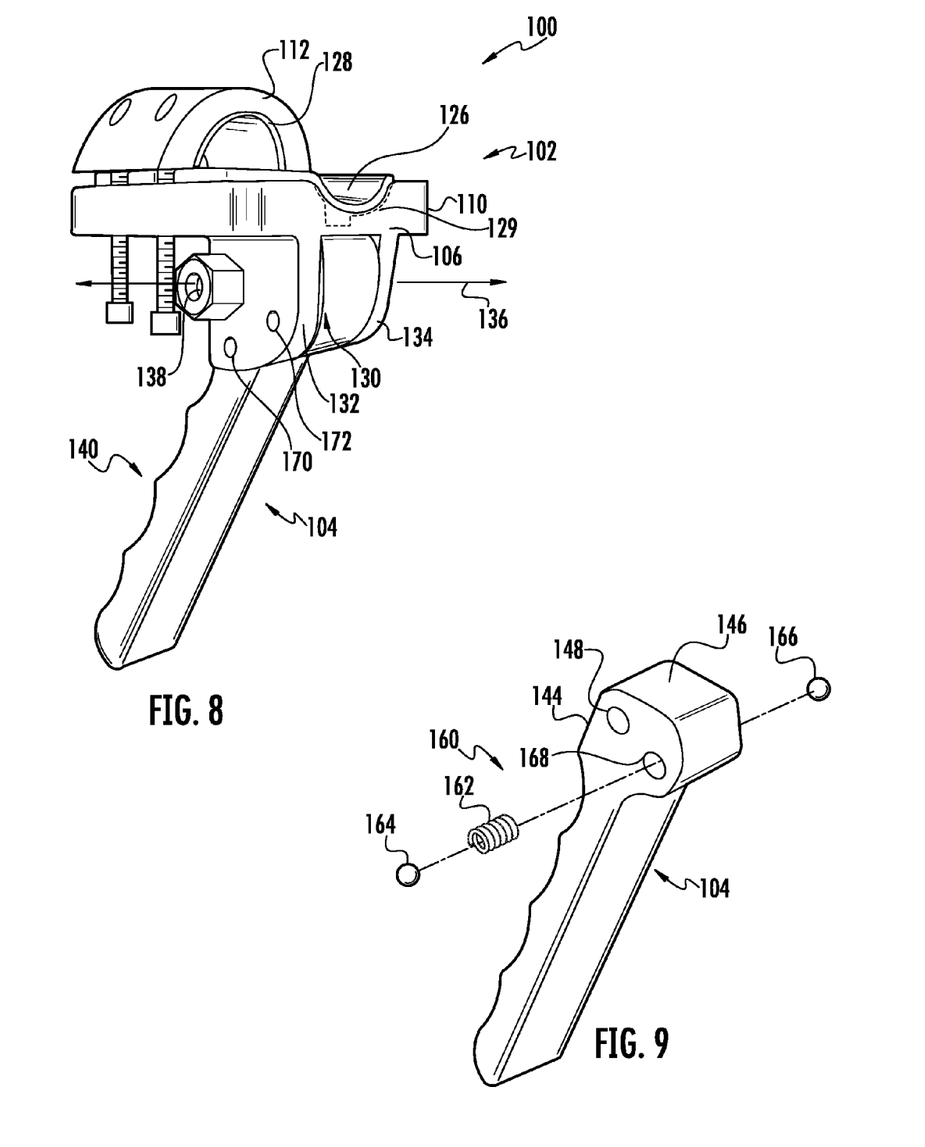
FIG. 8 is a perspective view of the stowable handle apparatus which shows a U-channel defined by the mounting device.
FIG. 9 is an exploded perspective view of the grip member and a bearing-and-spring assembly that biases the grip member into one or more stability-biased positions in relation to the mounting device.

In various example embodiments, the handle apparatus 100 includes one or more gripping inserts positioned adjacent to one or more of the inner surfaces. The gripping inserts can be provided in the form of a resilient material (e.g., rubber or rubber-like gripping inserts), a hard material, or various combinations of materials. Referring additionally to FIG. 8, in this example embodiment, gripping inserts 126 and 128 are positioned over (e.g., glued or otherwise adhered to) the inner surfaces 110 and 112, respectively.

In various example embodiments, the handle apparatus 100 includes a channel or other portion for providing an operational interface between the grip member 104 and another portion of the handle apparatus. Referring again to FIG. 8, in this example embodiment, the front portion 106 of the mounting device 102 includes a channel 130 (e.g., a U-channel) within which the grip member 104 is received. In this example embodiment, the front portion 106 includes channel walls 132 and 134 which define opposing sides of the channel 130, respectively. In this example embodiment, the grip member 104 is pivotally coupled to the mounting device 102 about an axis of rotation 136 that is located within (e.g., traverses) the channel 130. A rotational member 138 (e.g., a pivot bolt), positioned along the axis of rotation 136 and through an aperture in each of the channel wall 132, the grip member 104, and the channel wall 134, serves to mechanically couple the grip member 104 to the mounting device 102. The front portion 106 including the channel walls 132 and 134 can be formed, for example, from a rigid material (such as aluminum) or various combinations of materials.

In another example embodiment, one or more of the inner surfaces 110 and 112 is asymmetrically shaped. For example, as an alternative to providing an inner surface that is symmetrical in shape from the center of the channel 130 to either of its opposing sides, one or more of the inner surfaces 110 and 112 can be provided with an asymmetric shape, e.g., as represented by the asymmetric surface contour 129 (shown in dashed lines).

In various example embodiments, the bracket portion is configured such that the back portion can be mechanically coupled to the front portion at multiple different orientations in relation to the front portion or vice versa. For example, the back portion 108 is configured such that it can be mechanically coupled to the front portion 106 at multiple different orientations in relation to the front portion 106 (e.g., to facilitate different grip member orientations). In an additional example, the back portion 108 includes an inner surface that is shaped asymmetrically such that the back portion 108, in two of the orientations, provides a "reversible bracket" (e.g., for accommodating portions of left- and right-handed versions of an object, respectively.

Figure 6:
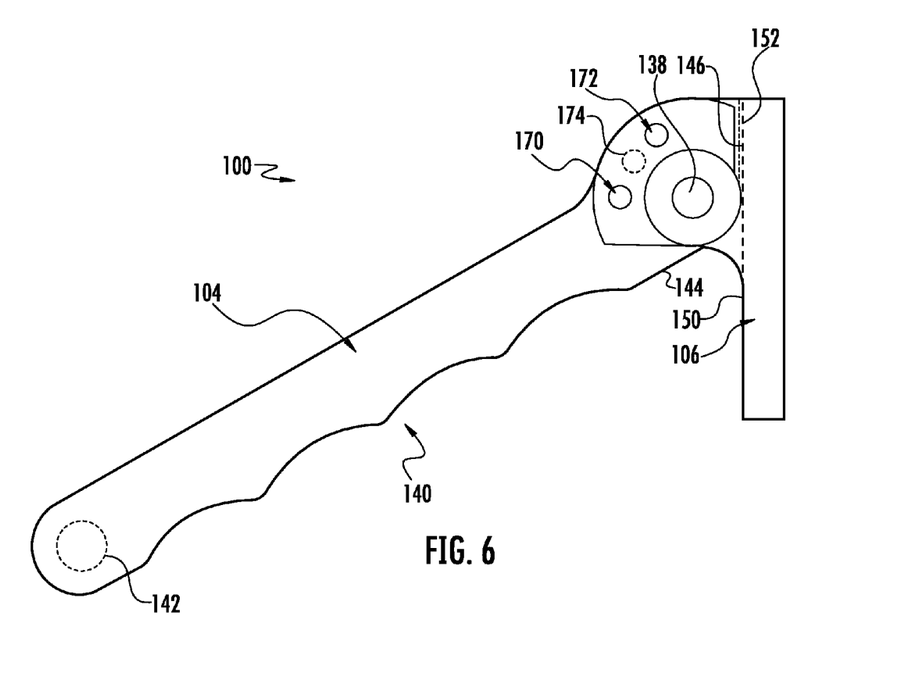
FIG. 6 is a side view of the stowable handle apparatus, shown in its deployed (or extended) configuration with portions of the mounting device of the handle apparatus removed.

Referring to FIGS. 4, 5 and 6, in this example embodiment, the grip member 104 includes a gripping surface 140. In example embodiments, the gripping surface 140 is shaped for gripping by a human hand. The grip member 104 can be formed, for example, from a rigid material (such as aluminum) or various combinations of materials.

The gripping surface 140 as well as other portions of the grip member 104 can be provided with surface treatments, coatings, or the like, as previously discussed, to modify one or more characteristics the grip member 104 relating, for example, to the efficacy with which a user can mechanically engage the grip member 104.

The grip member 104 is not limited to shapes and/or configurations suitable only for being mechanically engaged by being gripped by the fingers of a human hand. By way of example, as shown in FIG. 6, the grip member 104 can be alternatively shaped or formed to include an aperture 142 into which a hook or other implement can be inserted for mechanically engaging with the grip member 104 (e.g., to securely perform a lifting function when the grip member 104 is in its deployed position) and/or positionally manipulating the grip member 104 in relation to the mounting device 102.

In various example embodiments, the grip member 104 includes one or more stop surfaces or other devices configured to limit its movement in relation to another portion of the handle apparatus 100. Referring to FIGS. 4, 5, 6 and 9, in this example embodiment, the grip member 104 includes a first stop surface 144 and a second stop surface 146. Referring to FIG. 9 in particular, in this example embodiment, the grip member 104 includes an aperture 148 (which receives the rotational member 138), and the first and second stop surfaces 144 and 146 are symmetrically positioned (or oriented) as shown in relation to the aperture 148. In an example embodiment, the stop surfaces include two stop surfaces which are symmetrically positioned in relation to a location (on the grip member) at which the grip member is mechanically coupled to the mounting device.

In the illustrated example embodiment, the first stop surface 144 faces (and is substantially parallel with) a first portion 150 of the mounting device 102 when the grip member 104 is in the stowed configuration (FIG. 4), and the second stop surface 146 faces (and is substantially parallel with) a second portion 150 of the mounting device 102 when the grip member 104 is in the deployed configuration (FIGS. 5 and 6). In an example embodiment, the stop surfaces contact different portions of the mounting device (in mutually exclusive fashion) when the grip member is in the stowed configuration and the deployed configuration, respectively.

In this example embodiment, the first and second stop surfaces 144 and 146 (of the grip member 104) and the first and second portions 150 and 152 (of the mounting device 102) are substantially planar; however, the scope of the present invention contemplates that other shapes for these surfaces can also be provided.

In various example embodiments, the handle apparatus 100 includes a mechanism for biasing the grip member 104 toward one or more stability-biased positions (or locked positions) in relation to the mounting device. In an example embodiment, the biasing mechanism is mechanically coupled to the grip member 104. In an example embodiment, the biasing mechanism also provides a mechanical interface between the grip member 104 and the mounting device 102.

Referring additionally to FIG. 9, in this example embodiment, the handle apparatus includes a biasing mechanism that includes a bearing and spring assembly 160. In this example embodiment, the bearing and spring assembly 160 includes a spring 162 and ball bearings 164 and 166, which provide a rolling mechanical interface between the grip member 104 and the mounting device 102. In this example embodiment, the grip member 104 includes a channel 168 (e.g., a cylindrical channel through the grip member 104) in which the spring 162 is positioned. The ball bearings 164 and 166, which are slightly larger in diameter than the end openings of the channel 168, are positioned facing the respective ends of the channel 162 at opposite sides of the grip member 104. The ball bearings 164 and 166 are positioned in contact with (or mechanically coupled to) the opposite ends of the spring 162 such that the spring 162, during operation of the handle apparatus 100, biases the ball bearings 164 and 166 toward the channel walls 132 and 134, respectively.

In various example embodiments, an apparatus for stowing and deploying a hand grip includes a support structure (such as a platform, bracket, fastener, or other suitable hardware component) configured to facilitate securing the apparatus to an object of interest. In example embodiments, a bearing and spring mechanism is operationally engaged with such a support structure and configured to allow the hand grip to be stowed for normal operations of the object of interest or other times when the handle is not in use, and to be deployable into one or more other positions from which the hand grip can be used for lifting. In an example embodiment, the bearing and spring mechanism includes ball bearings. In an example embodiment, the bearing and spring mechanism includes a spring positioned adjacent to at least one of the ball bearings.

In an example embodiment, the support structure includes holes which the ball bearings detent into when the hand grip is stowed. In an example embodiment, the support structure includes holes which the ball bearings detent into when the hand grip is deployed into the one or more other positions. In an example embodiment, the bearing and spring mechanism includes a spring configured to apply a stability-biasing force sufficient to lock the hand grip in place when the hand grip is moved to one or more positions in relation to the support structure. In an example embodiment, the spring has a spring constant selected to allow a user of the apparatus to overcome the stability-biasing force in order to unlock the hand grip in order to reposition the hand grip in relation to the support structure.

In various example embodiments, the grip member 104 is biased toward one or more stability-biased positions (e.g., positions substantially fixed in relation to the mounting device 102). In an example embodiment, the one or more stability-biased positions are defined by one or more pairs of opposing recessed portions (e.g., located on the mounting device 102) configured to operatively engage with the bearing and spring assembly. In various example embodiments, the mounting device 102 includes one or more recessed portions configured to operatively engage with the biasing mechanism at each of one or more stability-biased positions.

Referring again to FIG. 8, in this example embodiment, the bearing and spring assembly 160 is configured to bias the grip member 104 toward two stability-biased positions. In this example embodiment, the channel walls 132 and 134 include two pairs of opposing recessed portions (or recesses) 170 and 172 configured to operatively engage with the bearing and spring assembly 160. In this example embodiment, the bearing and spring assembly 160 traverses the channel 130, and the ball bearings 164 and 166 are biased toward opposite sides of the channel 130, respectively.

In this example embodiment, the recessed portions 170 define a stowed position (for the grip member 104), which is stability-biased as a consequence of the ball bearings detenting into the recesses in the channel walls 132 and 134. In FIG. 4, the ball bearing 164 is shown seated in the recessed portion 170 of the channel wall 132. On the opposite side of the grip member 104, the ball bearing 166 is seated in the corresponding recessed portion 170 of the channel wall 134. Similarly, the recessed portions 172 define a deployed position (for the grip member 104), which is stability-biased as a consequence of the ball bearings detenting into the recesses in the channel walls 132 and 134. In FIG. 5, the ball bearing 164 is shown seated in the recessed portion 172 of the channel wall 132. On the opposite side of the grip member 104, the ball bearing 166 is seated in the corresponding recessed portion 172 of the channel wall 134. The angle θ (shown in FIG. 5), which represents the relative positioning or orientation of the grip member 104 in relation to the mounting device 102, can be adjusted in a variety of ways, for example, by changing the locations of the recesses in the channel walls.

In an example embodiment, the bearing and spring assembly is configured and positioned in relation to the grip member and mounting device such that opposite end portions of the bearing and spring assembly are mechanically engaged by the grip member independent of the position of the grip member in relation to the mounting device.

In an example embodiment, the bearing and spring assembly is coupled to the grip member and configured to mechanically engage with one or more recessed portions of the mounting device which define one or more stability-biased positions for the grip member. In an example embodiment, the one or more stability-biased positions include a first stability-biased position and a second stability-biased position, and different portions of the grip member are operationally engaged, mutually exclusively, with different portions of the mounting device in the first and second stability-biased positions, respectively.

In various example embodiments, a single stability-biased position is provided. In other example embodiments, the handle apparatus is configure to provide more than two stability-biased positions. Referring to FIG. 6, in an example embodiment, a third stability-biased position (between the first and second stability-biased positions) is defined by a recessed portion 174 (shown in dashed lines).

Figure 10:
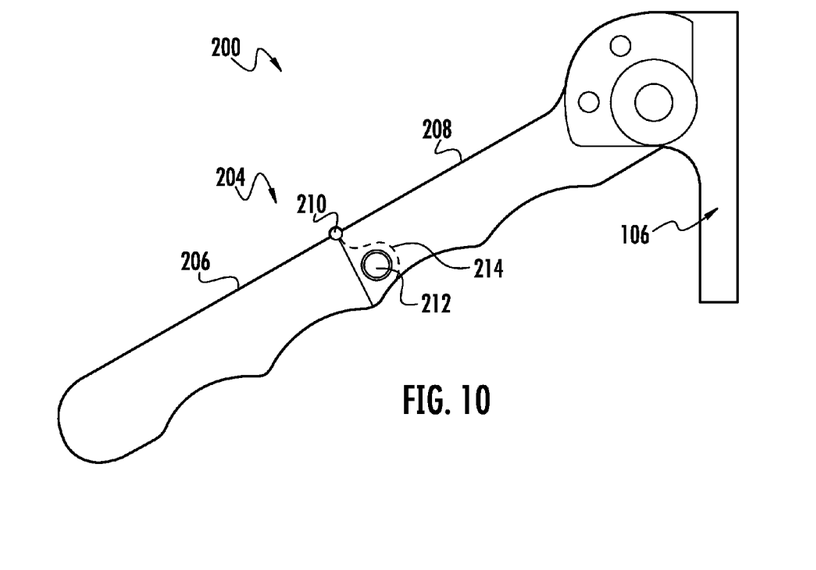
FIG. 10 is a side view of an alternative embodiment of a stowable handle apparatus that includes a foldable grip member, shown in its deployed (or extended) configuration with portions of the mounting device of the handle apparatus removed.

Referring to FIG. 10, in an alternative example embodiment, a handle apparatus 200 includes a foldable grip member 204, shown in its deployed (or extended) configuration. By way of example, the foldable grip member 204 includes first and second portions 206 and 208 which are pivotally coupled together by a hinge 210 or other mechanism. In an example embodiment, the hinge 210 is sufficiently stiff to hold the first portion 206 steady in position even after the first portion 206 has been moved into its folded position adjacent to the second portion 208. Other mechanisms for steadying or locking the grip member 204 in its foldable position can also be utilized. The second portion 208 is mechanically coupled to the front portion 106 in the same manner previously described with respect to the grip member 104. In this example embodiment, the first and second portions 206 and 208 interfit (e.g., utilizing respective complementary surfaces), and the handle apparatus 200 includes a latch 212 (e.g., a depressible spring-loaded button) which allows the user to lock the grip member 204 in its unfolded position and unlock the grip member 204 so that it can be folded. In an example embodiment, the handle apparatus 200 is configured such that complementary surfaces of the first and second portions 206 and 208 interfit inside one or both of the portions. For example, the complementary surfaces interfit along a boundary 214 (shown with a dashed line) located within the second portion 208. In an example embodiment, the grip member includes a first portion which is mechanically coupled to a mounting device and a second portion which is mechanically coupled to and foldable in relation to the first portion.

Figure 11:
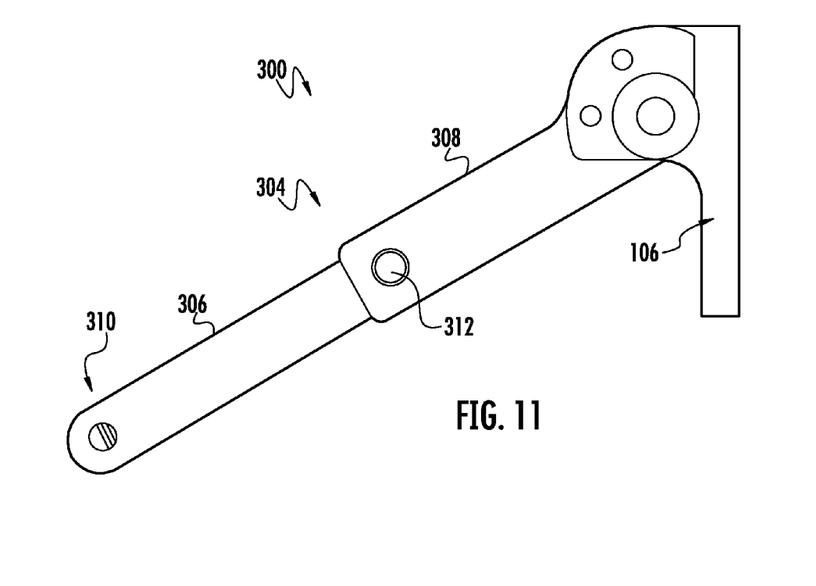
FIG. 11 is a side view of an alternative embodiment of a stowable handle apparatus that includes a telescopic grip member, shown in its deployed (or extended) configuration with portions of the mounting device of the handle apparatus removed.

Referring to FIG. 11, in an alternative example embodiment, a handle apparatus 300 includes a telescopic grip member 304, shown in its deployed (or extended) configuration. By way of example, the telescopic grip member 304 includes first and second portions 306 and 308 which are coupled together such that the first portion 306 can be slid (telescopically collapsed) into a hollow inner portion of the second portion 308. In an example embodiment, the handle apparatus 300 is configured such that complementary surfaces of the first and second portions 306 and 308 interfit, support, and/or face each other within the second portion 308 to facilitate the aforementioned telescopic movement. The second portion 308 is mechanically coupled to the front portion 106 in the same manner previously described with respect to the grip member 104. In this example embodiment, the handle apparatus 300 includes a first latch 310 (e.g., a depressible spring-loaded button) which allows the user to lock the grip member 304 in its collapsed position and unlock the grip member 304 from the collapsed position so that the first portion 306 can be withdrawn from the second portion 308. In this example embodiment, the handle apparatus 300 also includes a second latch 312 (e.g., a depressible spring-loaded button) which allows the user to lock the grip member 304 in its extended position and unlock the grip member 304 from the extended position so that the first portion 306 can be pushed back into the second portion 308. In an example embodiment, the grip member includes a first portion which is mechanically coupled to the mounting device and a second portion which is mechanically coupled to and telescopically collapsible within the first portion.

Figure 12:
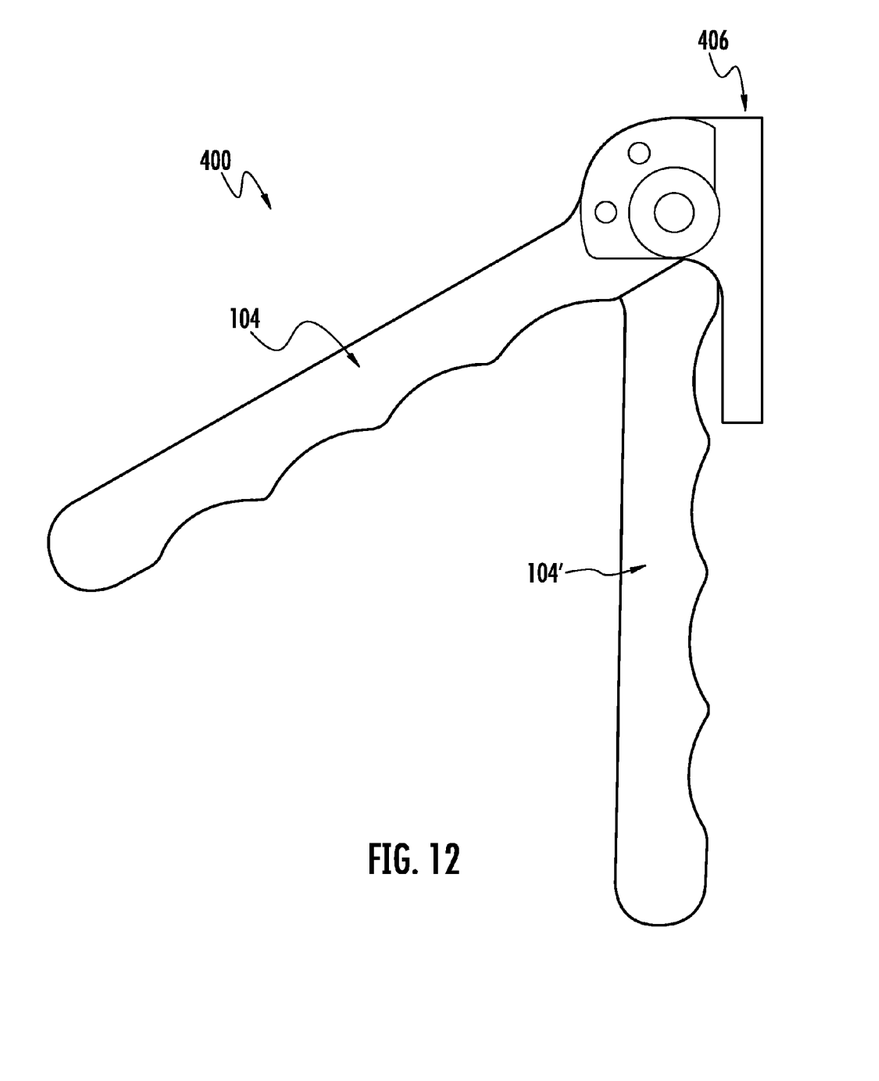
FIG. 12 is a side view of an alternative embodiment of a stowable handle apparatus that includes two grip members, one of which is shown in its deployed (or extended) configuration and the other of which is shown in its stowed (or refracted) configuration with portions of the mounting device of the handle apparatus removed.

In other example embodiments, a handle apparatus is provided with multiple grip members. Referring to FIG. 12, in an alternative example embodiment, a handle apparatus 400 includes grip members 104 and 104' which are mechanically coupled to a mounting device. In this example embodiment, a front portion (or portions) 406 of the mounting device includes multiple structures, such as the previously-described channel 130, to which the multiple grip members are mechanically coupled, respectively. In this example embodiment, the grip member 104 is shown in its deployed (or extended) configuration and the grip member 104' is shown in its stowed (or retracted) configuration. In various example embodiments, the handle apparatuses provide and/or are configurable in various arrangements of the multiple grip members to facilitate lifting or repositioning objects with different structural features or different types of objects.

In an example embodiment, a lifting device includes one or more hand grip handles configured to be affixed to a structural member of the object at a position providing a user, or users, of the lifting device with mechanical advantage to lift or reposition the object to a new position when one or more of the hand grip handle are deployed for use, the hand grip handles being configured to not significantly interfere with the general use of the object during normal operations when the hand grip handles are not deployed. In an example embodiment, at least one of the one or more hand grip handles is configured to facilitate an interface between a human hand and the at least one of the one or more hand grip handles. In an example embodiment, at least one of the one or more hand grip handles includes a structure that allows each individual finger to have a comfortable and more stable grip. In an example embodiment, at least one of the one or more hand grip handles includes a surface feature that is sufficiently soft or compliant to allow fingers to sink into the at least one of the one or more hand grip handles. In an example embodiment, the lifting device includes one or more back-straps with mounting hardware for interfacing with the object. In an example embodiment, the one or more back-straps are configured to allow the user to install and un-install the lifting device.

Features from the different example embodiments described herein can be combined in various ways to provide additional example embodiments of the stowable handle apparatus. For example, a handle apparatus with multiple grip members can include one or more foldable grip members.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A stowable handle apparatus comprising:
   a mounting device configured to facilitate securing the handle apparatus to an object;
   a grip member mechanically coupled to the mounting device such that the grip member is selectively repositionable between
      a stowed configuration in which the grip member is adjacent to a portion of the object when the mounting device is secured to the object, and
      a deployed configuration in which the grip member is oriented in relation to the mounting device such that at least a portion of the grip member extends from the object, with the grip member being operatively engaged with the mounting device facilitating an action by a user of the handle apparatus imparting a force against the grip member to lift or reposition the object; and
   a bearing and spring assembly configured to bias the grip member toward one or more stability-biased positions in relation to the mounting device;
   wherein the mounting device includes a channel within which the grip member is received;
   wherein the bearing and spring assembly includes two ball bearings which are biased toward opposite sides of the channel, respectively.

2. The stowable handle apparatus of claim 1, further comprising:
   a mechanism for biasing the grip member toward one or more stability-biased positions in relation to the mounting device.

3. The stowable handle apparatus of claim 2, wherein one of the one or more stability-biased positions substantially corresponds to the stowed configuration.

4. The stowable handle apparatus of claim 2, wherein one of the one or more stability-biased positions substantially corresponds to the deployed configuration.

5. The stowable handle apparatus of claim 2, wherein the biasing mechanism includes a bearing and spring assembly.

6. The stowable handle apparatus of claim 2, wherein the mounting device includes one or more recessed portions configured to operatively engage with the biasing mechanism at each of the one or more stability-biased positions.

7. The stowable handle apparatus of claim 1, further comprising:
   a bearing and spring assembly is configured to provide a rolling mechanical interface between the grip member and the mounting device.

8. The stowable handle apparatus of claim 1, wherein the grip member is pivotally coupled to the mounting device about an axis of rotation located within the channel.

9. The stowable handle apparatus of claim 1, wherein the bearing and spring assembly traverses the channel.

10. The stowable handle apparatus of claim 1, wherein the channel includes one or more pairs of opposing recessed portions configured to operatively engage with the bearing and spring assembly.

11. The stowable handle apparatus of claim 1, wherein the grip member is sized to fit within a recess defined by structural features of the object when the handle apparatus is secured to the object and the grip member is in the stowed configuration.

12. The stowable handle apparatus of claim 11, wherein the structural features include frame tubing for a motorcycle.

13. The stowable handle apparatus of claim 1, wherein the grip member is substantially flush with a portion of the object when the handle apparatus is secured to the object and the grip member is in the stowed configuration.

14. The stowable handle apparatus of claim 1, wherein the grip member includes a plurality of stop surfaces.

15. The stowable handle apparatus of claim 14, wherein the stop surfaces include two stop surfaces which are symmetrically positioned in relation to a location at which the grip member is mechanically coupled to the mounting device.

16. The stowable handle apparatus of claim 14, wherein the stop surfaces contact different portions of the mounting device when the grip member is in the stowed configuration and the deployed configuration, respectively.

17. The stowable handle apparatus of claim 14, wherein the stop surfaces include a first stop surface which faces a first portion of the mounting device when the grip member is in the stowed configuration, and a second stop surface which faces a second portion of the mounting device when the grip member is in the deployed configuration.

* * * * *